United States Patent [19]
Fallon et al.

[11] Patent Number: 6,134,308
[45] Date of Patent: Oct. 17, 2000

[54] CALLER ID LOGGING: ENTRY STORAGE ON A PER LINE BASIS

[75] Inventors: Joseph Michael Fallon, South Amboy; Rama Gabbita, Shrewsbury; Gary N. Weber, Fair Haven, all of N.J.

[73] Assignee: Lucent Technologies Inc., Murray Hill, N.J.

[21] Appl. No.: 09/092,399

[22] Filed: Jun. 5, 1998

[51] Int. Cl.$^7$ .................................................. H04M 15/06
[52] U.S. Cl. ........................................... 379/142; 379/157
[58] Field of Search .................................... 379/198, 157, 379/142, 93.23, 93.17, 164, 156, 201, 127

[56] References Cited

U.S. PATENT DOCUMENTS

| | | | |
|---|---|---|---|
| 5,119,413 | 6/1992 | Okumura et al. | 379/156 |
| 5,396,548 | 3/1995 | Bayerl et al. | 379/142 |
| 5,446,785 | 8/1995 | Hirai | 379/142 |
| 5,463,676 | 10/1995 | Ohsawa | 379/142 |
| 5,524,145 | 6/1996 | Parker | 379/197 |
| 5,754,635 | 5/1998 | Kim | 379/142 |
| 5,838,777 | 11/1998 | Chang et al. | 379/142 |
| 5,859,903 | 1/1999 | Lee | 379/142 |
| 5,946,382 | 8/1999 | Sugahara | 379/142 |
| 5,963,627 | 10/1999 | Mano et al. | 379/157 |

*Primary Examiner*—Curtis A. Kuntz
*Assistant Examiner*—Rexford Barnie

[57] ABSTRACT

A telephone system with a caller ID logging feature includes a plurality of telephone stations which share a plurality of telephone lines connected to the telephone system. Each one of the plural telephone lines is associated with one or more of the telephone stations. A control processor (CPU) monitors the incoming calls on the telephone lines connected to the telephone system, and also receives caller ID information from the Central Office of the telephone service provider. For unanswered incoming calls and answered calls which are to be stored, the CPU stores the associated caller ID information in a memory as a caller ID record including data indicating the telephone lines on which the incoming call was received. The stored caller ID records for each telephone line are accessible from telephone stations that are associated with that telephone line. Therefore, only one record is required which all users may access, thereby increasing the efficiency of the memory over prior art systems. The memory includes a minimum capacity per line so that a minimum number of records are allocated for each telephone line.

18 Claims, 8 Drawing Sheets

CALLER ID LOGGING: ENTRY STORAGE ON A PER LINE BASIS

BACKGROUND OF THE INVENTION

1. Field of the Invention

The present invention relates to a business telephone system connected to a plurality of telephone lines with caller ID logging for logging caller ID information records on a per telephone line basis.

2. Description of the Related Art

Business telephone systems are telephone systems that have a plurality of telephone stations (i.e. telephone sets or telephones) connected to a central system control unit or processor. The central processor is connected in turn to one or more telephone lines or trunks. The telephone lines connect the central processor to a Central Office (CO) of the telephone company to which the owner of the business telephone system subscribes; the plurality of telephone stations thus share the one or more telephone lines. The processor handles switching of the incoming calls between the telephone stations, intraconnecting of system telephones for conference calls, storing of voice mail messages for the individual stations, and other functions. The COs now optionally provide on the telephone line the number of an incoming call, a name associated with that number, and other information in a service denoted incoming caller line ID (ICLID). Subscribers to the service may have the ICLID information displayed when the incoming call causes one of the telephone stations to ring. A further function that is particularly advantageous for small businesses is an ICLID record logging function in which the ICLID information is stored as a record in a memory, and is then available for subsequent recall.

Prior art business telephone systems that have ICLID logging include a separate memory device or space arranged for each telephone station to store ICLID records. The memory space of these prior art devices is divided into respective sections on a per station basis and each station can access only its section of the memory. Each section stores a predetermined maximum number of records. In these prior art devices, each ICLID record must be saved in multiple sections of memory if more than one of the telephone stations is to have access to the information. Once a section of memory is full and another record is required to be stored, the oldest record in that section must be discarded to store the new record. This creates an inefficient use of memory, forcing system designers to choose between an expensive device in which each memory section is large enough to store an acceptable number of ICLID records and a less costly device that unsatisfactorily limits the number of ICLID records that can be stored.

SUMMARY OF THE INVENTION

The present invention comprises a telephone system with an incoming caller line ID (ICLID) record logging feature that uses a dynamic memory to store ICLID records. The ICLID record logging feature stores information for unanswered calls if and only if the call alerts a telephone line associated with the ICLID record logging feature, the call ceases alerting, and the call remains unanswered. Optionally, the ICLID record logging feature may also log ICLID records for answered calls. The following caller ID information is typically provided by the CO for each call:

Caller ID name or reason for absence thereof,

Caller ID number or reason for absence thereof, and

Caller ID date and time.

The following information is also generally stored with each record:

viewed/unviewed status, call answered/not answered, an identifier for the line on which the call arrived, whether an autodialback attempt has been made, and a sequential record number.

The ICLID record logging feature of the present invention does not statically divide the memory into discrete sections. Rather, the inventive ICLID record logging feature utilizes a single memory or memory part and stores therein each ICLID record with data indicating on which telephone line the call came in. Each telephone line connected to the telephone system is associated with one or more telephone stations of the system; multiple telephone lines may be associated with one station and multiple stations can be associated with the same telephone line.

The inventive caller ID record logging feature designates a minimum record capacity for each telephone line so that the designated minimum record capacity times the number of telephone lines is no greater than the maximum record capacity of the memory. Therefore, each of the telephone lines of the caller ID record logging feature will be guaranteed at least the minimum record capacity for each telephone line. The minimum record capacity per telephone line also assures that calls on light traffic lines are not deleted due to ICLID record traffic on higher usage telephone lines.

When new caller ID information arrives to be stored in the memory as an ICLID record, the memory is checked to determine whether an empty (free) record exists. If so, then the new caller ID information is stored in the free record. If no free records exist in the memory, then the oldest record for those telephone lines using more than the minimum record capacity is deleted and the thus freed-up record is used to store the new ICLID record. In a further embodiment, the oldest record that is not currently being viewed for those telephone lines having more than the minimum record capacity is deleted and the thus free-up record is used to store the new ICLID number.

An administrator of the system has the ability to program the ICLID record logging system for associating particular telephone stations with specific ones of the telephone lines. As stated above, multiple telephone lines may be associated with one station and multiple stations may be associated with the same telephone line.

Storing the ICLID records on a per telephone line basis results in a more efficient system because only one record needs to be stored even if multiple stations require access to the data. Storing the records on a per telephone line basis also allows a user at one station to potentially access all system records if that user is legitimately associated with all of the telephone lines. In prior art arrangements, a user can only accesses those records that are stored in his or her station's allotted memory space.

The fixed minimum capacity requirement assures that calls on light traffic lines are not deleted as a result of ICLID traffic on higher usage lines. The minimum capacity requirement also allows the ICLID record logging feature to dynamically allocate and distribute the ICLID records proportionally between the high and low traffic telephone lines. Finally, the use of a minimum capacity value for each telephone line reduces "wasted" records that the prior art devices set aside for line ports that are not in use or are not attached to caller ID capable lines.

Users preferably view the ICLID records in the memory on a Last In, First Out (LIFO) basis on predesignated lines by activating the ICLID record logging feature. That is, a user sees the "newest" (i.e. the most recently stored) record first, and then scrolls through the list to the "oldest" record of a designated telephone line or lines associated with the extension or telephone set to which the user is connected. Instead of the LIFO basis, the records could be viewed in a First In First Out (FIFO) basis or any other order that may be appropriate including a random order.

Other features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE
PRESENTLY PREFERRED EMBODIMENTS

Figure 1:
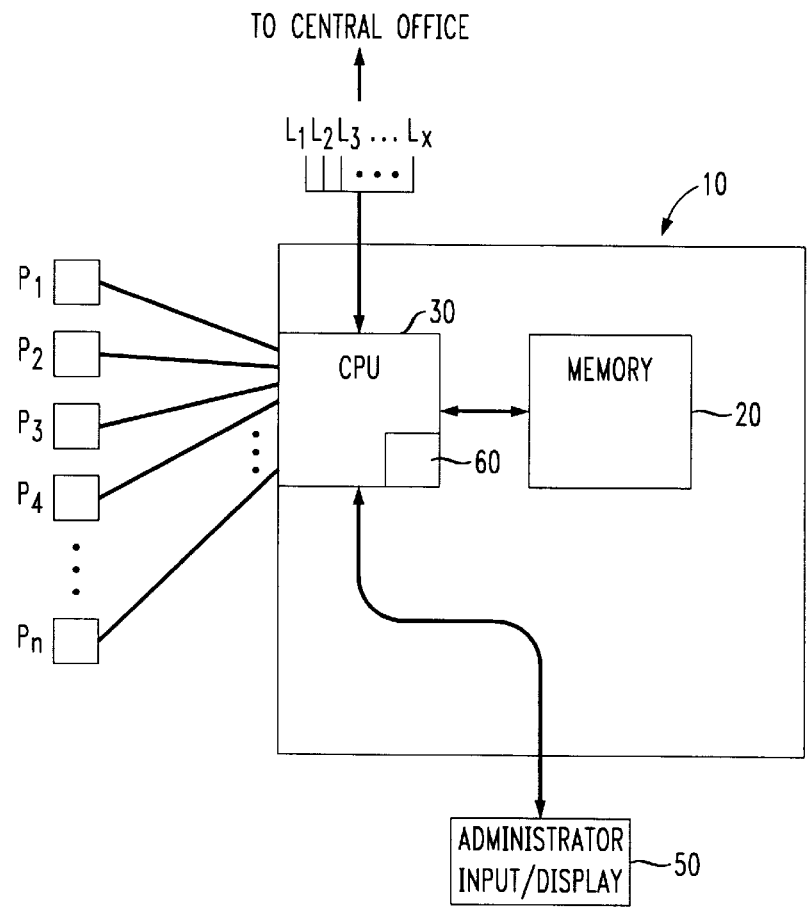
FIG. 1 is a block diagram showing the interconnections in a telephone system incorporating the caller ID logging feature according to the present invention.

Referring initially to FIG. 1, the incoming caller line ID (ICLID) logging feature according to the present invention is generally intended for installation or incorporation in a telephone system 10 that is connected to a plurality of telephone lines $L_1$–$L_x$ from a Central Office (CO) of a telephone service provider to which the user or owner of the telephone system 10 subscribes. The telephone system 10 may include a PBX, KSU-less systems, centrex systems, wireless systems, and key systems. The telephone lines $L_1$–$L_x$ are connected to a Central Processing Unit (CPU) 30. The CPU 30 is also connected to telephone stations $P_1$–$P_n$. In this configuration, the telephone stations $P_1$–$P_n$ share the telephone lines $L_1$–$L_x$. The telephone system 10 also includes a memory 20 connected to the CPU 30. A detector 60 is a subcomponent or programmed function of the CPU 30 that is programmed to monitor the telephone lines $L_1$–$L_x$ for identifying when a new call is alerting on a line $L_1$–$L_x$ and for determining whether a new ICLID record should be stored in the memory 20. The following ICLID information is typically provided by the CO for each call:

Caller ID name or reason for absence thereof,

Caller ID number or reason for absence thereof, and

Caller ID date and time.

The following information is also generally stored with each record:

viewed/unviewed status, call answered/not answered, an identifier for the line on which the call arrived, whether an autodialback attempt has been made, and a sequential record number.

An administrator input and display device 50 is also connected to the CPU 30 for, inter alia, associating individual phone stations $P_1$–$P_n$ with one or more of the telephone lines $L_1$–$L_x$. Through the administrator input device 50, the telephone system 10 may be arranged such that, for example, a call received on line $L_1$ is directed by CPU 30 to phone stations $P_1$ and $P_2$ and a call received on line $L_2$ is directed by CPU 30 to phone stations $P_3$ and $P_4$. An administrator may also select which of the lines $L_1$–$L_x$ per phone are associated with the ICLID record logging feature through the administrator input device 50.

In accordance with the invention, the telephone system 10 incorporating the ICLID record logging feature is electronically programmed or configured in a predetermined manner by the administrator input device 50. However, instead of selecting which of the lines $L_1$–$L_x$ are to be associated with the ICLID record logging feature, the telephone system 10 may include all of the telephone lines $L_1$–$L_x$. A sample telephone system 10 having two telephone lines $L_1$ and $L_2$ and four telephone stations $P_1$–$P_4$, where telephone stations $P_1$–$P_2$ are associated with telephone line $L_1$ and telephone stations $P_3$–$P_4$ are associated with telephone line $L_2$, will be used by way of example to explain the operation of the present invention. It should nevertheless be understood that any number of phone stations P and telephone lines L may be employed, limited only by the capacity of the system to handle them, and that it is not necessary that there be more telephone stations than telephone lines.

Figure 2:
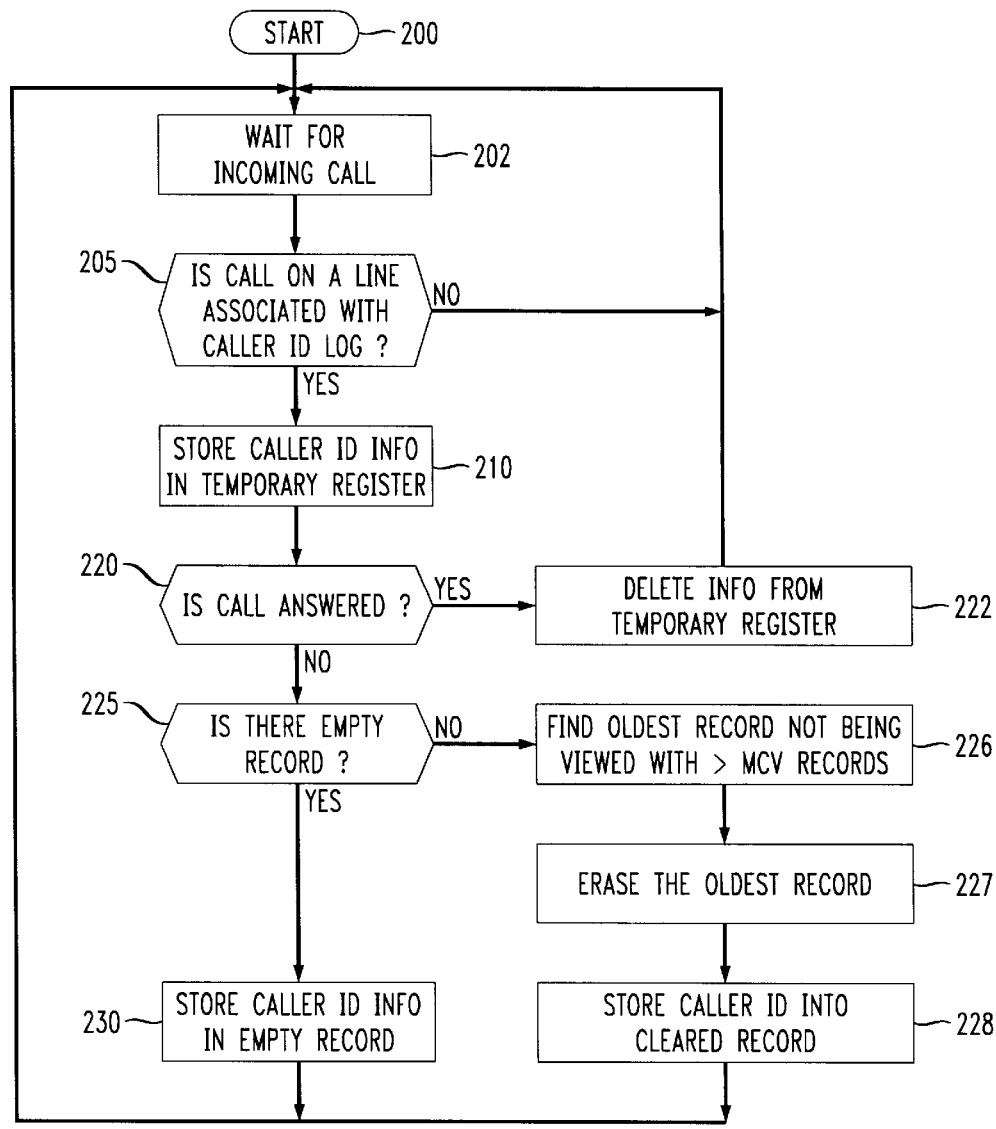
FIG. 2 is a flow chart for storing a caller ID record in the memory.

The operation of the inventive ICLID record logging feature begins at step 200 in FIG. 2, when the system is activated. Activation of the ICLID record logging feature may be automatically activated when the telephone system is turned on, or may be selectively activated and deactivated from the administrator input device 50. After being activated, the telephone system 10 waits for an incoming call to arrive on one of the telephone lines $L_1$–$L_2$ at step 202. When a call arrives from the CO on any of the telephone lines $L_1$–$L_2$ that is associated with the ICLID record logging feature (in this case both of the lines $L_1$ and $L_2$ are associated with the ICLID record logging feature), the detector 60 temporarily stores ICLID information which is received from the CO in a temporary register in the CPU at step 210, in the form of an ICLID record. If the call arrives on a telephone line that is not associated with the ICLID record logging feature 205, then the process of FIG. 2 returns to step 202 to await another call. Step 220 determines whether the incoming call is answered by one of the stations $P_1-P_4$. If the call is answered, the in a preferred form of the invention, the CPU deletes the information from the temporary register at step 222. However, if the call remains unanswered, then the CPU stores the ICLID record from the temporary register to an empty record in the memory 20. In an optional embodiment described hereinbelow, the user may also record an ICLID record for answered calls.

Memory 20 contains or has associated therewith a preset or programmable minimum capacity value y implemented so as to guarantee that at least y number of ICLID records can be stored in memory 20 for each telephone line. The minimum capacity y may be different for each telephone line. The minimum capacity values y are selected, and/or the memory 20 is sized, such that the sum of all minimum capacity values y of each of the available telephone lines x is not greater than the total record capacity of the memory. During the process of storing of ICLID records in memory 20, the CPU 30 at step 225 determines whether the memory contains an available empty record. If an empty record exists, then the new ICLID record is stored directly in the empty record at step 230. If on the other hand, no empty records are available for the telephone line associated with the new ICLID record, step 226 locates the oldest record for all telephone lines then having more than the minimum capacity value y of records. Step 227 deletes (clears) the record that is identified in step 226, and step 228 stores the new ICLID record into the now cleared record. In lieu of a minimum capacity value y that is the same for each telephone line, each telephone line may alternatively have a different or varying minimum capacity as a function of how busy the line is normally or currently. If, for example, Line 1 usually receives twice as many calls as Line 2, then the minimum capacity for Line 1 may, for example, be set to 12 and the minimum capacity for Line 2 to 6. As will be apparent, any suitable allocation of minimum capacities may be employed so long as the sum of all of the minimum capacities does not exceed the total record capacity of the memory.

In an alternate embodiment, the administrator may lack the ability to programmably associate or disassociate telephone lines with the ICLID record logging feature. In this case, step 205 in FIG. 2 is omitted and all incoming calls are eligible to be logged if they remain unanswered.

Figure 2A:
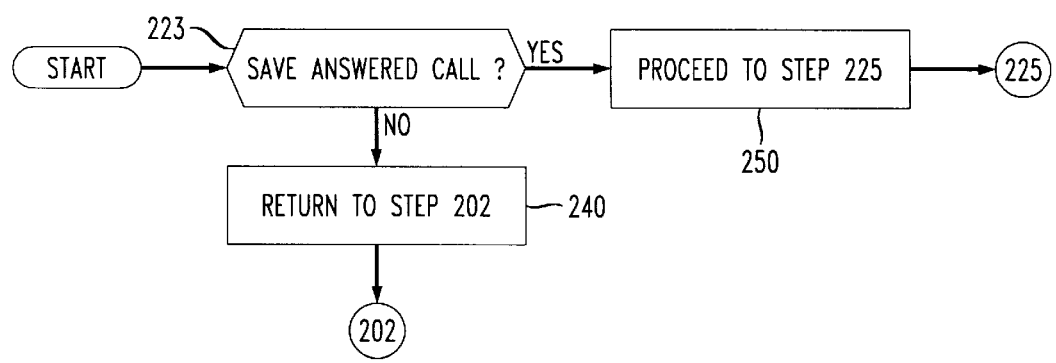
FIG. 2A is a flow chart showing the optional steps for storing an answered caller ID record.

In a further alternate embodiment, the user may optionally save the ICLID information as well when the call is answered. In this modified embodiment, if the answer is "yes" in step 220, then step 223 (FIG. 2A) is performed to determine whether the user has opted to save the answered call. If not, then the method returns to step 202; if the answer is yes, then an Answered by Me flag is added to the ICLID information and the inventive method returns to step 225 to save the ICLID record. In a further embodiment, the ICLID record for the call that has been answered is accessible only to the extension which answered the call, even though other telephones stations may be associated with the line on which the call was received.

Figure 1A:
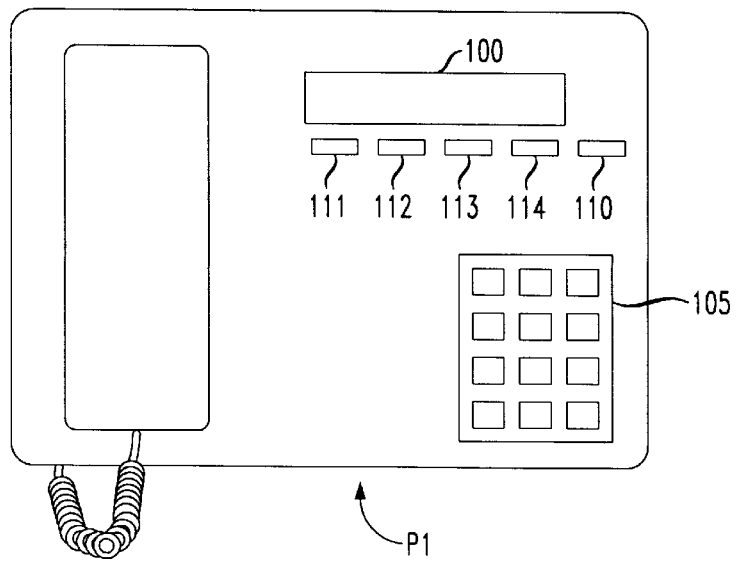
FIG. 1A is plan view of a telephone station of the telephone system of the present invention showing the display and command buttons.
Figure 3:
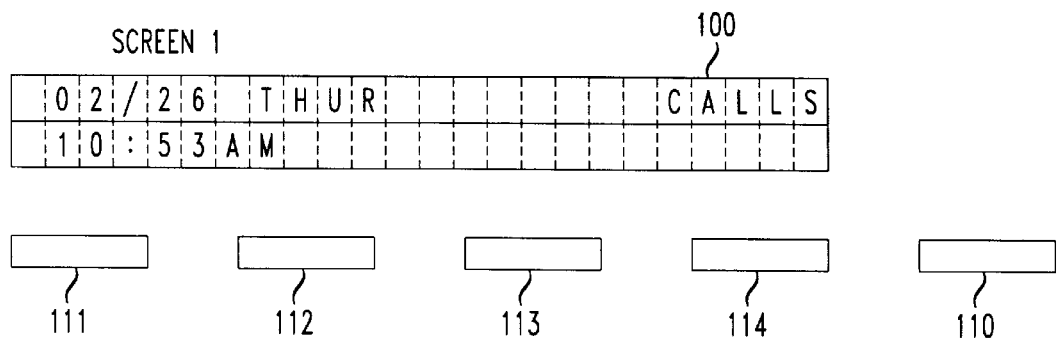
FIG. 3 is a view of the display and user-actuatable switch buttons of the telephone station of FIG. 1A showing the display when a user has new caller ID records.

As depicted in FIG. 1A, each of the individual telephone stations $P_1-P_n$ (station $P_1$ is shown as an example) includes a display 100, a call log switch button 110, first, second, third, and fourth soft keys 111, 112, 113, and 114 (collectively referred to as soft keys 111–114), and a standard numeric keypad 105. Although the preferred embodiment depicts four switch keys, a greater or lesser number of keys may alternatively be provided for access to all of the functions of the invention. FIG. 3 depicts a typical display for an individual telephone station with the ICLID record logging feature. The word "calls" appearing at the upper right side of the display 100 indicates to the user of that telephone station that new records have been stored in the ICLID record memory 20 for incoming calls on a telephone line associated with that station. To view these new ICLID records, the ICLID record logging feature can be accessed at anytime during operation by pressing the call log button 110.

Each ICLID record includes three screens of ICLID information (screen 5, screen 6, and screen 7) displayable for viewing on display 100. Screen 5 indicates the telephone number of the ICLID record, screen 6 indicates a name associated with the telephone number of the ICLID record, and screen 7 indicates the date and time of the incoming call that resulted in creation of the ICLID record. Each screen also includes labels positionally juxtaposed relative to, and indicating an action or function to be performed through actuation of the soft keys 111–114 located immediately below the display 100 in the telephone station $P_1$.

Although the preferred embodiments described herein contemplate three accessible screens of information for each record stored in the memory 20, greater than or less than three screens may be used and only one screen of information is needed to implement the invention. That one screen may display either the number of the incoming call or the name associated with that call.

The preferred form of screen display 100 has two rows of 24 columns and spans all four soft keys 111–114. However, the display may alternatively be longer or shorter in length and still perform the same functions. In one alternate embodiment, the display extends above or adjacent only three soft keys; in that case, the fourth soft key (e.g., 114) may instead have a single specific function. Similarly, in lieu of soft keys the invention may be implemented with fixed function or hard wired function keys for the required operations. A mix of hard wired keys and soft keys may also be used.

Figure 4:
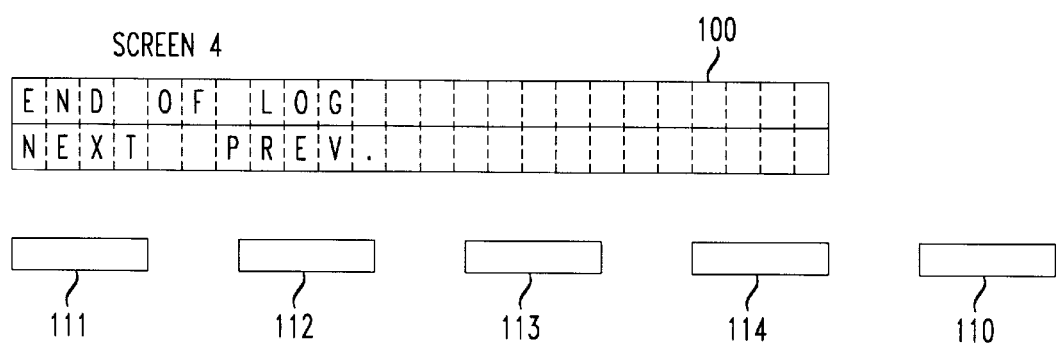
FIG. 4 is a view of the display and user-actuatable switch buttons of the telephone station of FIG. 1A showing the end of log display.
Figure 12:
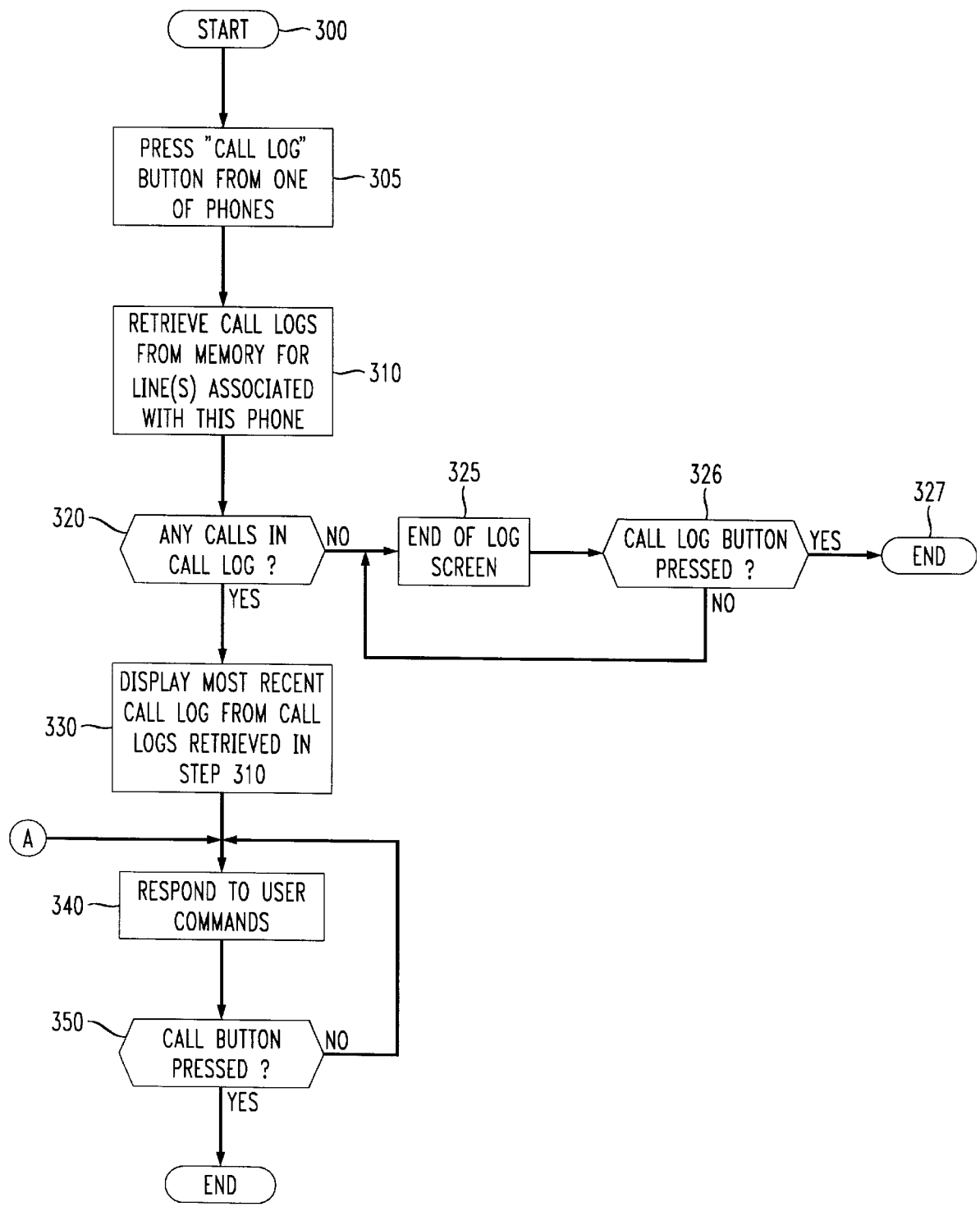
FIG. 12 is a flow chart showing the steps for viewing caller ID records.

As shown in FIG. 12, an ICLID record retrieval routine is initiated at step 305 by user-depression or actuation of the call log button 110. Each telephone station is associated with one or more of the telephone lines $L_1-L_x$ and has access to those records which are recorded on lines associated with that telephone station. In step 310 the ICLID records that were recorded from the telephone lines $L_1-L_x$ which are associated with the telephone station being used are retrieved from the memory 20. In our example, if the telephone station being used is telephone station $P_1$, then calls that were recorded from line $L_1$ will be retrieved. If on the other hand telephone station $P_1$ was associated with all of the telephone lines $L_1-L_x$, then all ICLID records would be accessible from telephone station $P_1$. At step 320, the retrieval routine determines whether any ICLID records in memory 20 were retrieved at step 310. In response to initiating the ICLID record retrieval routine, data is displayed on the top line of the display 100, the contents of which depends on the status of the retrieved ICLID records. If, for example, no records were retrieved, then screen 4 shown in FIG. 4, which states "End of Log", will be displayed to indicate that there are no stored ICLID records for that telephone station $P_1$. As noted above, each screen displayed on display 100 includes labels for the then-active functions of the soft keys 111–114. In the case of screen 4, the first soft key 111 is labeled "Next" and the second soft key 112 is labeled "Prev" (for "previous"). Since the third and fourth soft keys 113, 114 are not labeled, they do not perform any functions for screen 4 and will have no effect when pressed. An alternate embodiment using hard wired keys instead of soft keys obviates the requirement for labels on the display. The actions provided by the "Next" and "Prev" labelled keys are to view the next oldest and next most recent ICLID records, respectively; as explained in greater detail below. Where no ICLID records were retrieved, actuation of the Next or Prev keys (first soft key 111 or second soft key 112) will simply cause screen 4 to be redisplayed as there are no other stored ICLID records.

Figure 5:
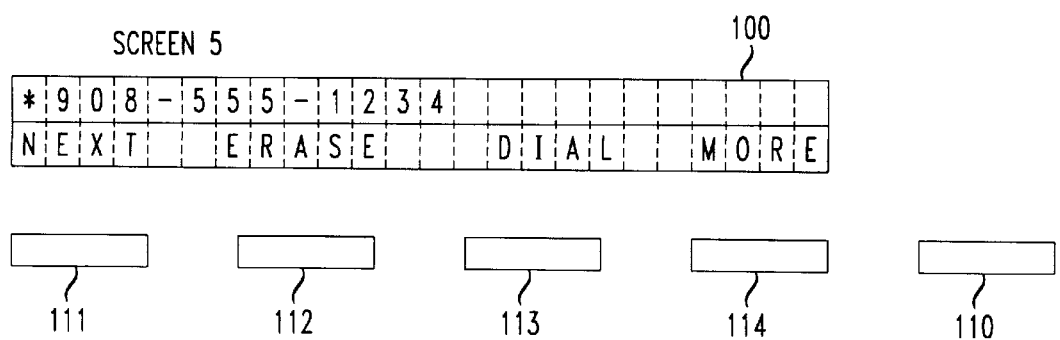
FIG. 5 is a view of the display and user-actuatable switch buttons of the telephone station of FIG. 1A showing screen 5 of the display.

If in step 320 stored ICLID records are retrieved from the memory 20, then screen 5, which is shown in FIG. 5, will appear on the display 100 indicating the telephone number of the newest (i.e. most recently stored) ICLID record (step 330). Although in the preferred embodiment the newest ICLID record is the first to be displayed, the stored ICLID records may be displayed in any order, including the oldest records first, or in a random order. In step 340, the retrieval program responds to commands inputted by the user.

Figure 13:
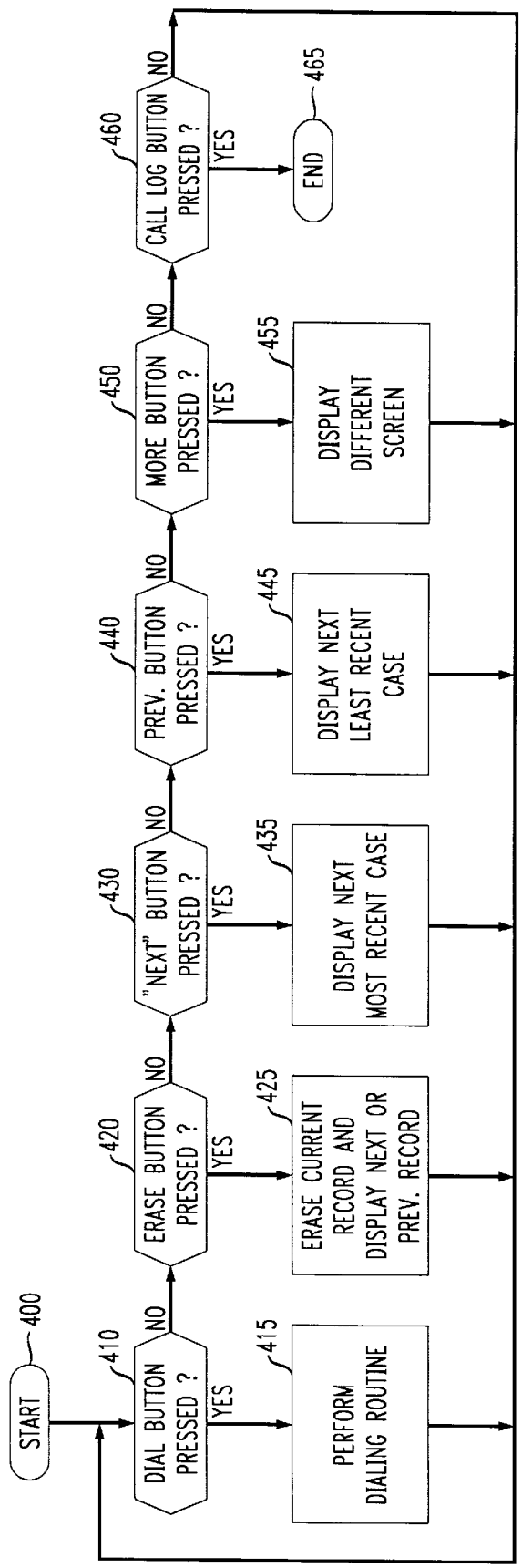
FIG. 13 is a flow chart showing the response to various user commands.

The various currently contemplated user commands are indicated in FIG. 13. From screen 5, the available user commands are "Next", "Erase", "Dial", and "More", which are displayed above their corresponding soft keys 111–114. Pressing the "Next" key (first soft key 111) at step 430 will cause the retrieval routine to display screen 5 for the next older stored ICLID record at step 435; the program then awaits another command. The asterisk on the left side of the display in FIG. 5 indicates that the record is an unviewed record for the telephone extension being used. If the ICLID record had previously been viewed by this extension, then the leftmost column will be blank.

Figure 8:
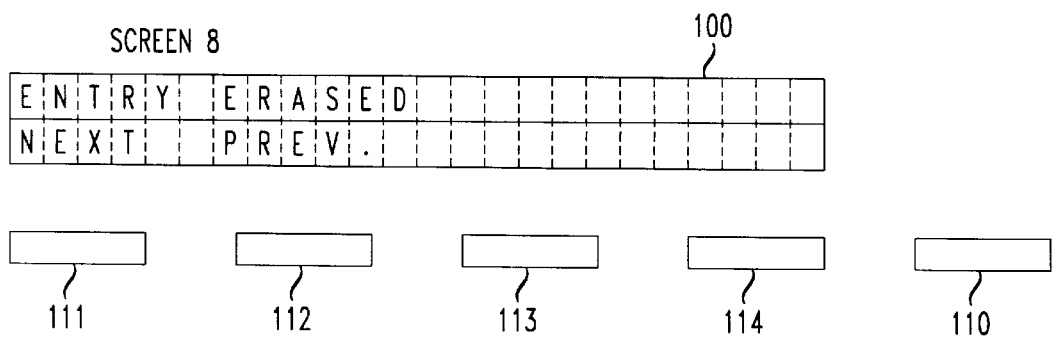
FIG. 8 is a view of the display and user-actuatable switch buttons of the telephone station of FIG. 1A showing the entry erased message on the display.

Another available command in screen 5 is "Erase". When the "Erase" key (second soft key 112) is pressed at step 420, the currently displayed ICLID record is marked as erased for the viewing extension only, and is still available to be viewed by other extensions. Screen 8, which is depicted in FIG. 8, is displayed to verify that the erasure is complete (step 425). From screen 8, the user has two command options. The user can select to view one of the older or the next newer ICLID record (first and second soft keys 111 and 112). If there is no next newer or next older entry, then screen 4 will be displayed as described above. Otherwise, screen 5 or screen 6 of the next/previous ICLID record is displayed, depending on which screen was displayed when the "Erase" key was pressed. After completion of these steps, the program awaits a further command.

Figure 6:
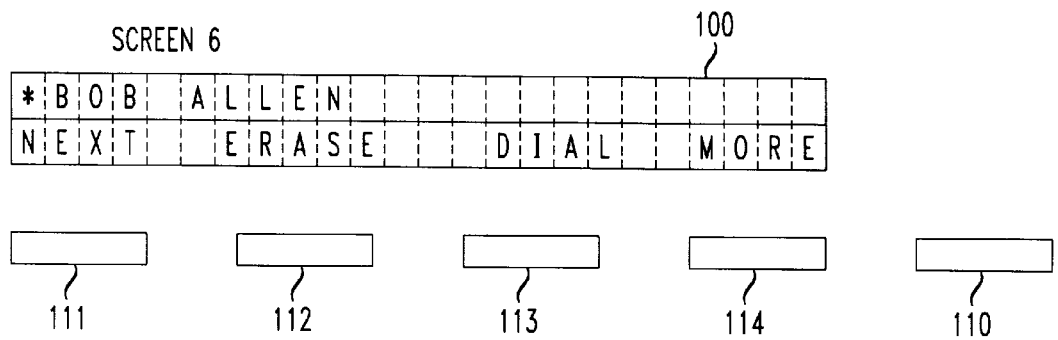
FIG. 6 is a view of the display and user-actuatable switch buttons of the telephone station of FIG. 1A showing screen 6 of the display.
Figure 7:
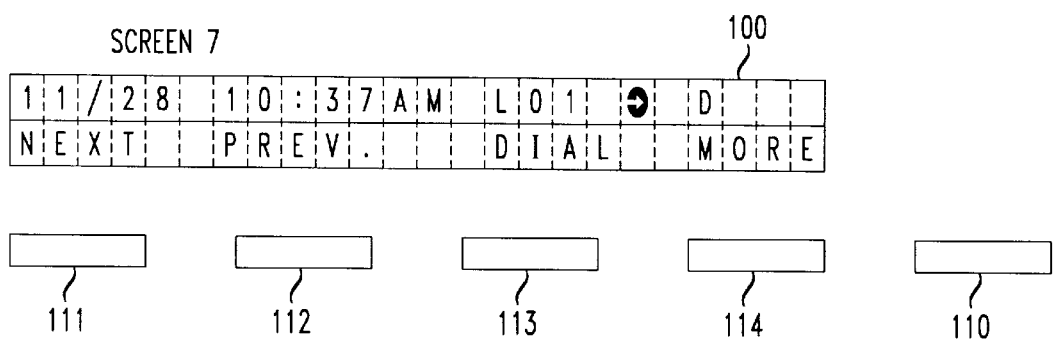
FIG. 7 is a view of the display and user-actuatable switch buttons of the telephone station of FIG. 1A showing screen 7 of the display.

Another available command in screen 5 is the "More" key (fourth soft key 114). When the "More" key is pressed at step 450 screen 6, depicted in FIG. 6, displays (step 455) a name associated with the telephone number for the current ICLID record being viewed. Screen 6 includes the same available user commands as does screen 5. If the "More" key (fourth soft key 114) is pressed while screen 6 is displayed, screen 7 (depicted in FIG. 7) shows the date and time of creation or storage of the ICLID record. The commands in screen 7 are labelled "Next", "Prev", "Dial" and "More". The "Prev" command (second soft key 112), when actuated (step 440), displays the next most recent ICLID record at step 445; the program then awaits another command from the user. Column 19 in screen 7 is reserved for the optional→symbol which, when present, indicates that the incoming call was answered. Similarly, column 21 is reserved for the optional D symbol which, when present, indicates that auto dialback has been attempted. The symbol D may be programmed to appear whether or not the auto dialback attempt was successful. In another embodiment, the symbol D appears only for successful auto dialback attempts.

Figure 9:
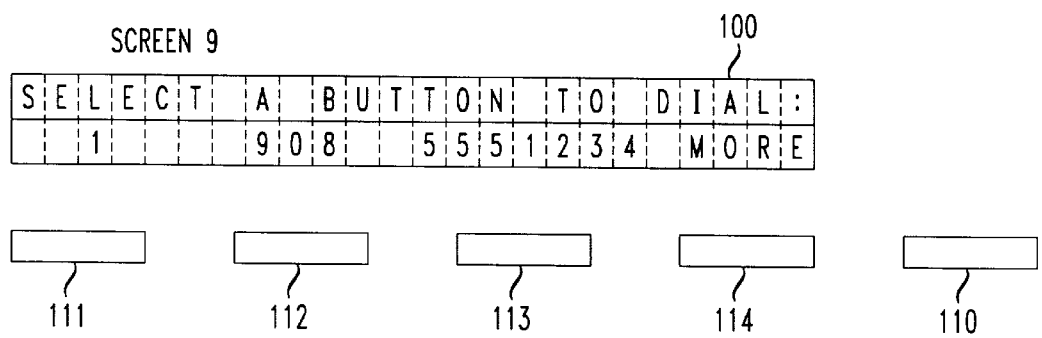
FIG. 9 is a view of the display and user-actuatable switch buttons of the telephone station of FIG. 1A showing screen 9 of the display.
Figure 10:
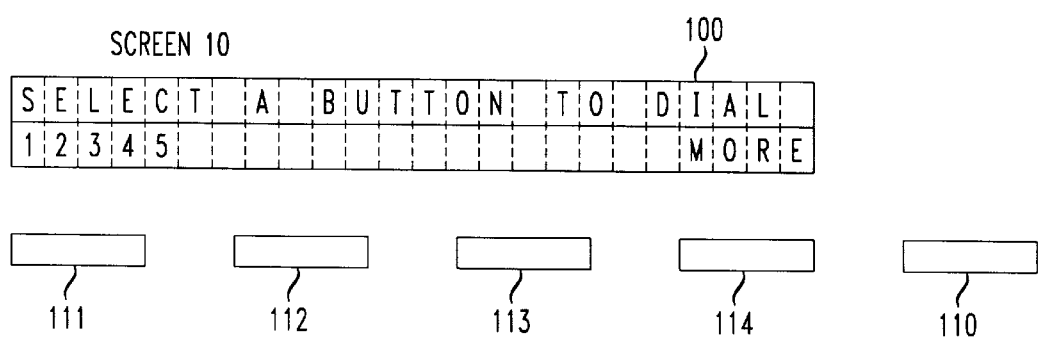
FIG. 10 is a view of the display and user-actuatable switch buttons of the telephone station of FIG. 1A showing screen 10 of the display.
Figure 14:
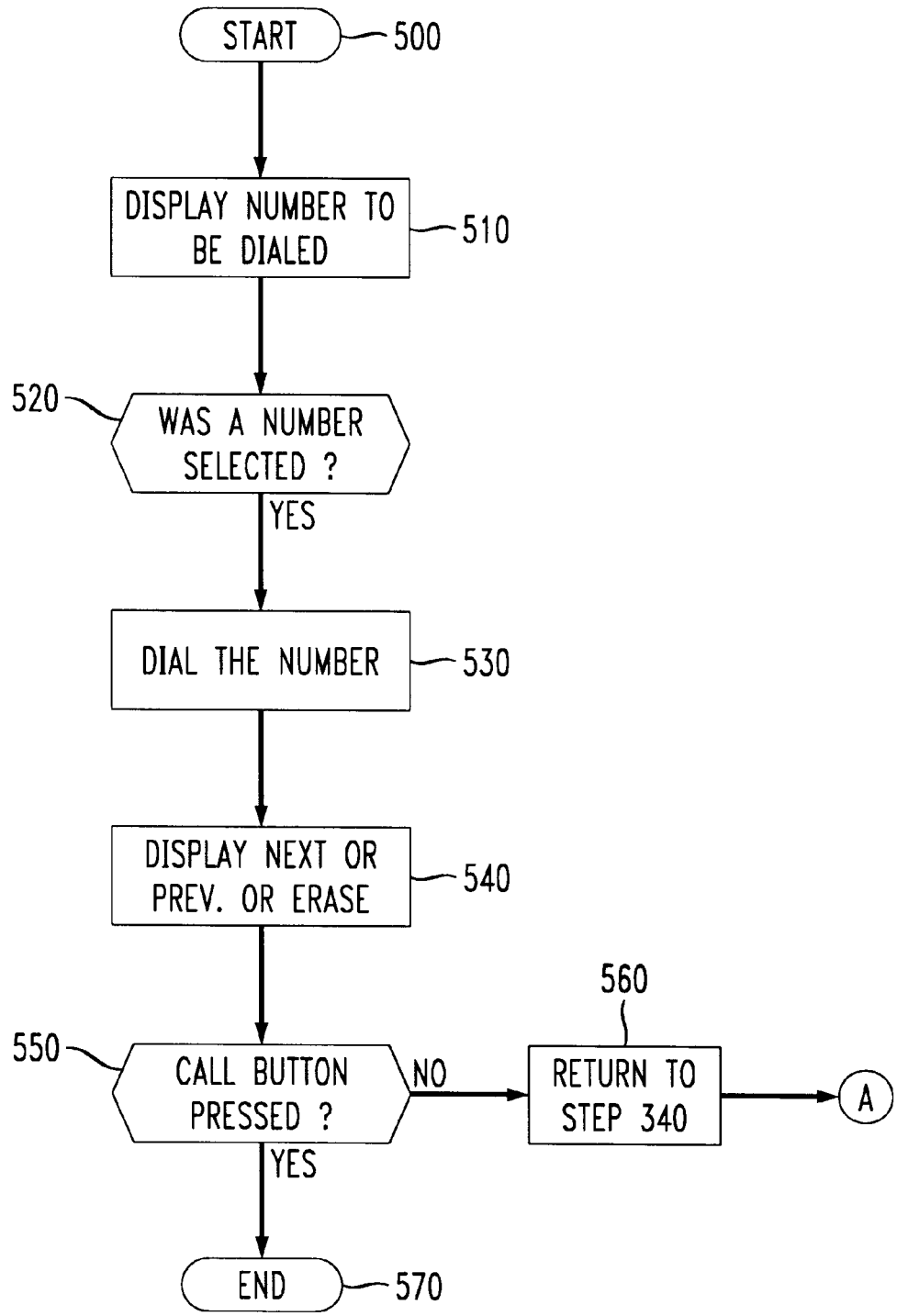
FIG. 14 is a flow chart showing the automated dial routine.

The user may also automatically dial the displayed telephone number, or a part thereof, of the ICLID record from screens 5, 6, or 7. When the "Dial" key (third soft key 113) is pressed at step 410, the dialing routine is performed by the program at step 415 and the program then awaits a further command from the user. The dialing routine is shown in FIG. 14. At step 510, after the "Dial" key is pressed, the telephone number to be dialed is displayed in screen 9 (FIG. 9). The 7 Digit telephone number is displayed above the third soft key 113, the 3 digit area code of the telephone number of the current ICLID record is displayed over the second soft key 112, and a "1" is displayed above the first soft key 111. To dial a displayed seven digit telephone number, the user need only press the third soft key 113. If the user wishes to dial the combination of the area code and the displayed seven digit number, the second soft key 112 is pressed. Finally, if the user wishes to dial the combination of a 1 and the displayed area code and the displayed seven digit number, then the first soft key 111 is pressed. In this manner, the user can automatically return the call by pressing only one button, irrespective of whether an area code or "1" prefix is required to complete the call from the user's location. Instead of a "1", other numbers or codes which may be required to initiate a call from the particular location may also be programmed into the telephone system so that the user may, as before, return the call by pressing only a single button. If a telephone number in the current ICLID records does not conform to the normal 7 digit or 10 digit standard, then the stored number is displayed at step 510 in its entirety in left justified form at the bottom of the display screen as shown in screen 10 of FIG. 10.

Figure 11:
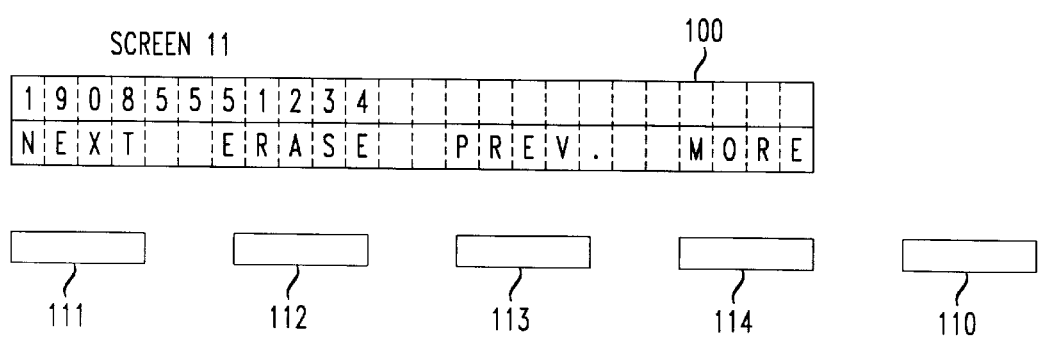
FIG. 11 is a view of the display and user-actuatable switch buttons of the telephone station of FIG. 1A showing screen 11 of the display.

At step 520, the program determines whether any one of the first, second, and third soft keys 111, 112, 113 has been pressed; if so, then the corresponding telephone number is dialed (step 530). After dialing of the number, screen 11 (FIG. 11) is displayed at step 540. Screen 10 shows the number that was dialed and labels the soft keys 111–114 "Next", "Erase", "Prev" and "More". The "More" key 114 in screens 9, 10, and 11, when depressed or actuated, brings up the next display screen 5, 6, or 7 that was displayed when the "Dial" function was initiated. Thus, the next one of the screens 5, 6, or 7, in that repeating order, is displayed each time that the "More" key is pressed.

While there have been shown and described and pointed out fundamental novel features of the present invention as applied to a preferred embodiment thereof, it will be understood that various omissions and substitutions and changes in the methods described and in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A method of storing incoming caller ID information records in a memory of a business telephone system connected to a plurality of telephone lines and including a plurality of telephone stations, comprising the steps of:
   (a) associating one of said plurality of telephone lines with one of said plurality of telephone stations;
   (b) monitoring all incoming calls on the plurality of telephone lines with a processor;
   (c) receiving incoming caller ID information from a Central Office for each incoming call on the plurality of telephone lines;
   (d) storing in the memory the received caller ID information for each unanswered call as a caller ID record so as to associate the stored caller ID information with the telephone line on which the call was received; and
   (e) allocating a minimum number of records in the memory for each of said plural telephone lines.

2. A method of storing incoming caller ID information records in a memory of a business telephone system connected to a plurality of telephone lines and including a plurality of telephone stations, comprising the steps of:
   (a) associating one of said plurality of telephone lines with one of said plurality of telephone stations;
   (b) monitoring all incoming calls on the plurality of telephone lines with a processor;
   (c) receiving incoming caller ID information from a Central Office for each incoming call on the plurality of telephone lines;
   (d) storing in the memory the received caller ID information for each unanswered call as a caller ID record so as to associate the stored caller ID information with the telephone line on which the call was received; and
   (e) selecting selected ones of said plurality of telephone lines to be monitored for incoming calls, and wherein said step of monitoring further comprises monitoring only said selected ones of said plural of telephone lines and said step of storing further comprises storing the caller ID information only for the selected ones of said plural telephone lines.

3. The method of claim 1, wherein said step of storing further comprises:
   (f) temporarily storing the caller ID information in the processor of the telephone business system;
   (g) determining that an incoming call is unanswered; and
   (h) storing the caller ID information for the incoming call determined to be unanswered in step (g).

4. The method of claim 3, wherein said step (h) further comprises:
   (i) checking the memory for a free record in which a new caller ID record may be stored;
   (j) storing the caller ID information for the incoming call in the free record if a free record is found in said step (i);
   (k) determining an oldest caller ID record for all telephone lines having more than a minimum amount of caller ID records stored in the memory, if a free record is not found in said step (i);
   (l) erasing the oldest caller ID record found in said step (k); and
   (m) storing the caller ID information for the incoming call in the erased caller ID record of said step (l).

5. The method of claim 1, further comprising the steps of determining if answered calls are to be stored, and storing the caller ID information for an incoming call when the incoming call is answered if it is determined that answered calls are to be stored.

6. The method of claim 1, further comprising the step of accessing, from the one of plural telephone stations, a stored caller ID record in the memory associated with the one of the plural telephone lines.

7. The method of claim 6, wherein said step of accessing the stored caller ID record comprises:
   selecting one stored caller ID record from among a plurality of caller ID records stored in the memory and that were received on the one of the plural telephone lines that is associated with the one of the plural telephone stations; and
   transmitting the one of the plural of stored caller ID records to the one of the plural telephone stations.

8. The method of claim 7, further comprising the step of transmitting a next one of the plural stored of caller ID records to the one of the plural telephone stations.

9. The method of claim 7, further comprising the step of sorting the plural stored caller ID records for transmission to the one of the plural telephone stations in reverse chronological order; and
   said step of transmitting a selected one of the plural stored caller ID records comprising transmitting a newest in time of the plural stored caller ID records to the one of the plural telephone stations.

10. The method of claim 7, further comprising the step of transmitting one of a next newest and a next oldest of the plural stored caller ID records to the one of the plural telephone stations.

11. The method of claim 1, wherein said step of allocating further comprises the steps of allocating a first minimum number of records in the memory for a first of said plural telephone lines and a second minimum number of records in the memory for a second of said plural telephone lines, wherein said first minimum number and said second minimum number are based on a number of calls normally received on each of the first and second of said plural telephone lines.

12. A device for logging incoming caller ID information records for unanswered incoming calls on a telephone system having a plurality of telephone stations and connected to a plurality of telephone lines, said device comprising:
   a processor having a dynamic memory for storing incoming caller ID information as a caller ID information record so that each said stored caller ID information record is associated in the memory with the one of the telephone lines on which it was received, and wherein said memory allocates a minimum number of record spaces for each of said plural telephone lines; and
   each of said plural telephone stations connected to said processor comprising means for accessing selected ones of the stored caller ID records in said memory and a display for displaying a currently selected one of the stored caller ID records.

13. The telephone system of claim 12, wherein each of the plural telephone stations is associated with a selected one of the plural telephone lines for receiving at the said telephone station incoming telephone calls on the selected one telephone line, and wherein said means for accessing comprises means for accessing on each telephone set only ones of the stored caller ID records that are associated with incoming telephone calls on the selected one telephone line associated with the each telephone station.

14. A device for logging incoming caller ID information records for unanswered incoming calls on a telephone system having a plurality of telephone stations and connected to a plurality of telephone lines, said device comprising:
- a processor having a dynamic memory for storing incoming caller ID information as a caller ID information record so that each said stored caller ID information record is associated in the memory with the one of the telephone lines on which it was received, and wherein said memory allocates a minimum number of record spaces for each of said plural telephone lines;
- each of said plural telephone stations connected to said processor comprising means for accessing selected ones of the stored caller ID records in said memory and a display for displaying a currently selected one of the stored caller ID records; and
- an administrator input device operatively connected to said processor for selecting the selected one of the plural telephone lines for association with the plural telephone stations.

15. The telephone system of claim 12, wherein said processor is operatively connected for temporarily storing incoming caller ID information for each incoming call, for determining whether the incoming caller ID information should be stored in the memory as a caller ID information record, and for storing the incoming caller ID information in the memory as a caller ID information record associated with the telephone line in which the incoming telephone call identified by the incoming caller ID information record was received.

16. The telephone system of claim 12, wherein said processor is operatively connected to said plurality of telephone lines for storing incoming caller ID information as a caller ID record by searching the memory for a free record, and
- if a free record is found in the search, storing the incoming caller ID information in the free record if a free record is found, and
- if no free record is found in the search,
  - (i) identifying an oldest stored caller ID record in the memory for all telephone lines having more than a minimum number of caller ID records stored in the memory,
  - (ii) erasing the identified oldest stored caller ID record, and
  - (iii) storing the incoming caller ID information in the memory in the erased caller ID record.

17. The telephone system of claim 12, wherein said processor is operatively connected to said plural telephone lines for storing in the memory incoming caller ID information for an answered incoming call when a user of the telephone system activates a save as answered function.

18. A device for logging incoming caller ID information records for unanswered incoming calls on a telephone system having a plurality of telephone stations and connected to a plurality of telephone lines, said device comprising:
- a processor having a dynamic memory for storing incoming caller ID information as a caller ID information record so that each said stored caller ID information record is associated in the memory with the one of the telephone lines on which it was received, and wherein said memory allocates a minimum number of record spaces for each of said plural telephone lines; and
- each of said plural telephone stations connected to said processor comprising means for accessing selected ones of the stored caller ID records in said memory and a display for displaying a currently selected one of the stored caller ID records,
- wherein the caller ID information comprises one of a caller ID name and a reason for absence, one of a caller ID number and a reason for absence, and a caller ID date and time; and
- wherein said processor is operatively connected for storing and displaying, with each caller ID information record, data comprising a viewed/unviewed status, a call answered/not answered status, a two-digit telephone line number on which an incoming telephone call was received, and an auto dialback status.

* * * * *